US011315232B2

(12) United States Patent
Benvegnu et al.

(10) Patent No.: US 11,315,232 B2
(45) Date of Patent: Apr. 26, 2022

(54) RESIDUE DETECTION USING A LUMINANCE HISTOGRAM

(71) Applicant: Applied Materials, Inc, Santa Clara, CA (US)

(72) Inventors: Dominic J. Benvegnu, La Honda, CA (US); Nojan Motamedi, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 24 days.

(21) Appl. No.: 16/659,408

(22) Filed: Oct. 21, 2019

(65) Prior Publication Data

US 2020/0126211 A1     Apr. 23, 2020

Related U.S. Application Data

(60) Provisional application No. 62/749,094, filed on Oct. 22, 2018.

(51) Int. Cl.
  *G06T 7/00*     (2017.01)
  *G06T 7/90*     (2017.01)
  *G06T 7/41*     (2017.01)

(52) U.S. Cl.
  CPC .............. *G06T 7/0004* (2013.01); *G06T 7/41* (2017.01); *G06T 7/90* (2017.01); *G06T 2207/10024* (2013.01); *G06T 2207/30148* (2013.01)

(58) Field of Classification Search
  CPC .......... G06T 7/0004; G06T 7/90; G06T 7/41; G06T 2207/30148; G06T 2207/10024; G06T 2207/20008; G06T 7/00; G06T 5/40; H04N 1/46; H04N 9/77; G06F 3/0486; B24B 49/12; C03C 15/00; G01B 11/02; H01L 21/66; H01L 21/304
  See application file for complete search history.

(56) References Cited

U.S. PATENT DOCUMENTS

| 6,142,855 | A | 11/2000 | Nyui et al. |
| 7,362,448 | B1 | 4/2008 | Liu et al. |
| 8,902,247 | B2 | 12/2014 | Min et al. |
| 9,561,577 | B2 | 2/2017 | Kimba |
| 2004/0259472 | A1 | 12/2004 | Chalmers et al. |
| 2006/0043071 | A1 | 3/2006 | Lee et al. |
| 2007/0077671 | A1 | 4/2007 | David et al. |
| 2009/0136117 | A1* | 5/2009 | Barkol ............. H01L 21/67242 382/145 |

(Continued)

FOREIGN PATENT DOCUMENTS

| JP | 2013-110390 | 6/2013 |
| KR | 10-2012-0091578 | 8/2012 |

OTHER PUBLICATIONS

PCT International Search Report and Written Opinion in International Appln. No. PCT/US2019/057214, dated Mar. 25, 2020, 10 pages.

*Primary Examiner* — Duy M Dang
(74) *Attorney, Agent, or Firm* — Fish & Richardson P.C.

(57) ABSTRACT

A method of determining whether a substrate is properly polished includes obtaining an image of the substrate, obtaining intensity values of a luminance plane for the image, generating an intensity histogram from the intensity values of the luminance plane, and analyzing the intensity histogram to determine whether the intensity histogram meets one or more criteria.

19 Claims, 4 Drawing Sheets

(56) References Cited

U.S. PATENT DOCUMENTS

| | | |
|---|---|---|
| 2014/0093987 A1 | 4/2014 | David et al. |
| 2014/0206259 A1 | 7/2014 | Benvegnu et al. |
| 2017/0140525 A1 | 5/2017 | Benvegnu et al. |
| 2018/0061032 A1 | 3/2018 | Benvegnu |

* cited by examiner

RESIDUE DETECTION USING A LUMINANCE HISTOGRAM

CROSS-REFERENCE TO RELATED APPLICATIONS

This application claims priority to U.S. Provisional Application Ser. No. 62/749,094, filed Oct. 22, 2018, the disclosure of which is incorporated by reference.

TECHNICAL FIELD

This disclosure relates to optical metrology, e.g., to detect residue on a substrate.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the metallic layer remaining between the raised pattern of the insulative layer form vias, plugs, and lines that provide conductive paths between thin film circuits on the substrate. For other applications, such as oxide polishing, the filler layer is planarized until a predetermined thickness is left over the non-planar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

Variations in the slurry distribution, the polishing pad condition, the relative speed between the polishing pad and the substrate, and the load on the substrate can cause variations in the material removal rate. These variations, as well as variations in the initial thickness of the substrate layer, cause variations in the time needed to reach the polishing endpoint. Therefore, determining the polishing endpoint merely as a function of polishing time can lead to overpolishing or underpolishing of the substrate. A substrate that has been underpolished, for example, can have a layer of residue, i.e. a portion of the filler layer remaining on the wafer.

Various optical metrology systems, e.g., spectrographic or ellipsometric, can be used to detect residue on a substrate, e.g., at an in-line or stand-alone metrology station. In addition, various in-situ monitoring techniques, such as monochromatic optical or eddy current monitoring, can be used to detect a polishing endpoint.

SUMMARY

In one aspect, a method of determining whether a substrate is properly polished includes obtaining an image of the substrate, obtaining intensity values of a luminance plane for the image, generating an intensity histogram from the intensity values of the luminance plane, and analyzing the intensity histogram to determine whether the intensity histogram meets one or more criteria.

In another aspect, a computer program product, tangibly embodied in non-transitory computer readable medium, includes instructions for causing one or more processors to receive an image of the substrate, obtain intensity values of a luminance plane for the image, generate an intensity histogram from the intensity values of the luminance plane, and analyze the intensity histogram to determine whether the intensity histogram meets one or more criteria.

In another aspect, a system for obtaining a measurement representative of a thickness of a layer on a substrate includes a support to hold a substrate for integrated circuit fabrication, an optical assembly to capture an image of at least a portion of the substrate, and a controller. The controller is configured to receive the image from the optical assembly, obtain intensity values of a luminance plane for the image, generate an intensity histogram from the intensity values of the luminance plane, and analyze the intensity histogram to determine whether the intensity histogram meets one or more criteria.

In another aspect, a method of determining whether a substrate is properly polished, including obtaining an image having at least one luminance channel of the substrate, generating an intensity histogram from intensity values of a luminance plane for the image, and analyzing the intensity histogram to determine whether the intensity histogram meets one or more criteria.

Implementations of any aspect can include one or more of the following features.

Obtaining the image may include obtaining a raw image having three color planes, and obtaining the intensity values for the luminance plane may include calculating the intensity values for the luminance plane based on values in the color planes. Calculating the intensity values for the luminance plane may include transforming the raw image from an RGB color space to a hue-saturation-luminosity color space. Obtaining the image may include obtaining a raw image having a luminance plane.

A threshold value may be calculated from intensity histograms of a plurality of test substrates. Analyzing the intensity histogram may include detecting a presence of a peak in the intensity histogram below a threshold value. Analyzing the intensity histogram may include detecting that a peak in the intensity histogram extends across a threshold value. Analyzing the intensity histogram may include determining one or more of a peak width, a peak shape, or a degree of asymmetry of a peak in the intensity histogram. If the intensity histogram is determined to not meet the one or more criteria, and a signal may be generated indicating presence of residue on the substrate.

The substrate may include a first dielectric layer disposed over a second dielectric layer. The first dielectric layer may be a low-κ dielectric material and the second dielectric layer may be SiN.

Analyzing the intensity histogram can include detecting a presence of a peak in the intensity histogram that is below a threshold value. The method can further include calculating the threshold value from intensity histograms of a plurality of test substrates. Analyzing the intensity histogram can also include determining a peak width, a peak shape, and/or a degree of symmetry of a peak in the intensity histogram. The method can further include determining that the histogram does not meet the one or more criteria, and generating a signal indicating presence of residue on the substrate. The luminance plane can include a color channel of the image. The luminance plane can also include a luminance channel of the image.

Implementations can include one or more of the following potential advantages.

Residue can be detected on a substrate, and substrates that have unacceptable levels of residue can be flagged either for further polishing or for discarding. This information can also be used in a feed-forward or feed-back use to control polishing parameters, providing improved uniformity and reduced residue.

The method for determining whether a substrate is properly polished can be simple and have low computational load.

The method can also produce fewer false negatives and false positives than existing techniques in determining whether substrates meet certain criteria. For example, thin layers of residue are difficult to detect using existing techniques, and so substrates that have thin, but unacceptable, layers of residue may be incorrectly accepted using existing techniques.

The details of one or more implementations are set forth in the accompanying drawings and the description below. Other aspects, features and advantages will be apparent from the description and drawings, and from the claims.

DESCRIPTION OF DRAWINGS

Like reference symbols in the various drawings indicate like elements.

DETAILED DESCRIPTION

Whether a substrate has been properly polished can be optically determined, e.g. at an in-line or stand-alone metrology station. For example, after a substrate is polished a layer of residue may remain on portions of the substrate, indicating that the substrate is not yet acceptable. Existing techniques for determining whether a substrate has been properly polished can have mixed results. For example, one technique is to obtain an optical image of the substrate, and analyze the image. However, existing image processing algorithms can lead to false positives, i.e. substrates that have an unacceptable layer of residue can be determined by the algorithm to be properly polished, and false negatives, i.e., substrates that have been properly polished can be determined by the algorithm to be unacceptable.

A technique that may be more accurate in determining whether a substrate has been properly polished is to use a histogram of intensity values of a luminance plane for an image of the substrate. In some implementations, a user can analyze the shape or cumulative density of the histogram below a certain threshold value to determine whether the substrate has been properly polished.

Figure 1:
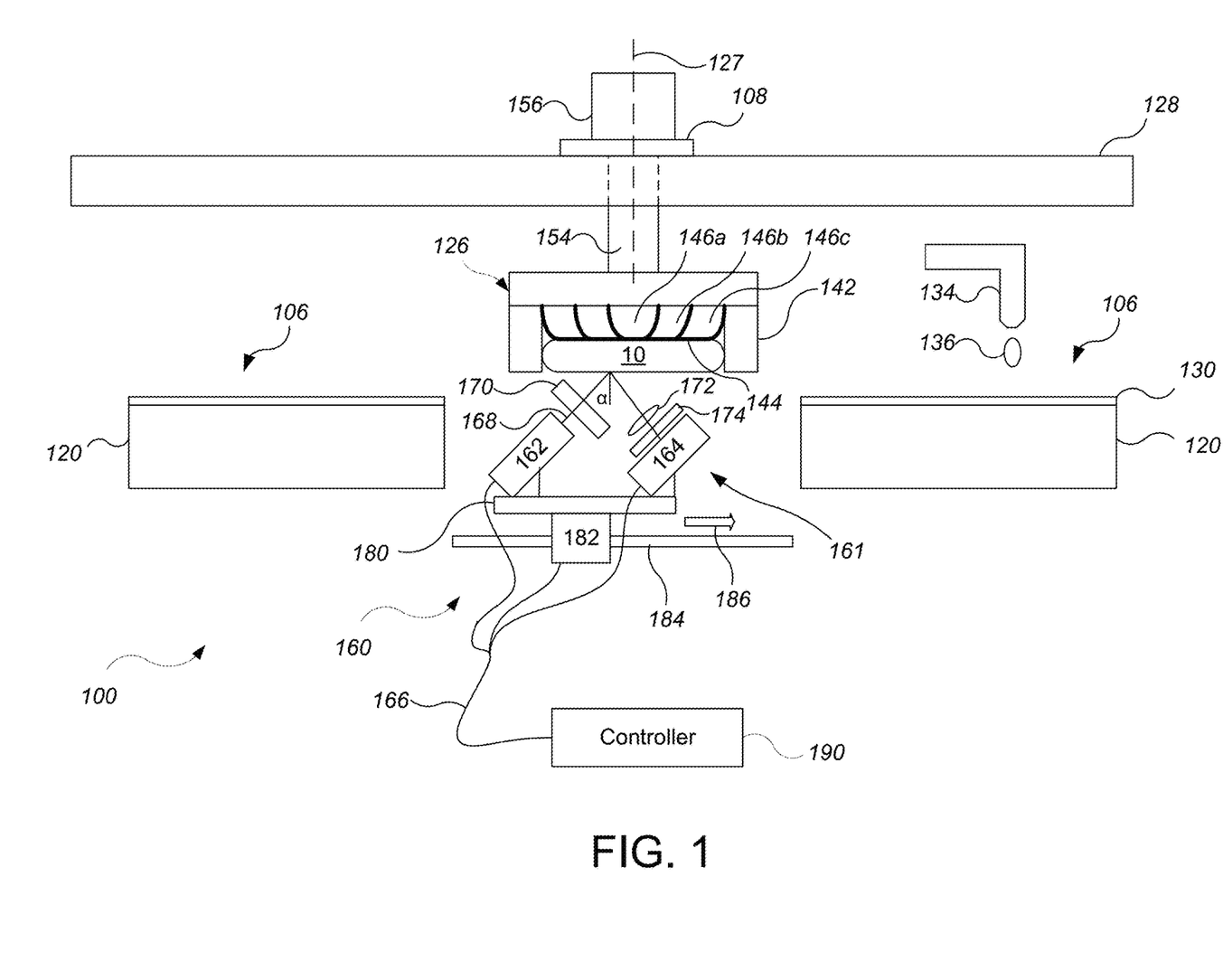
FIG. 1 illustrates a schematic view of an example of an in-line optical measurement system.

Referring to FIG. 1, a polishing apparatus 100 includes an in-line (also referred to as in-sequence) optical metrology system 160, e.g., an imaging system.

The polishing apparatus 100 includes one or more carrier heads 126, each of which is configured to carry a substrate 10, one or more polishing stations 106, and a transfer station to load substrate to and unload substrates from a carrier head. Each polishing station 106 includes a polishing pad 130 supported on a platen 120. The polishing pad 130 can be a two-layer polishing pad with an outer polishing layer and a softer backing layer.

The substrate 10 can include a first dielectric layer disposed over a patterned second dielectric layer. As a particular example, the first dielectric layer can be a low-κ dielectric material deposited by a spin-on process, e.g., a carbon-doped oxide or organic polymers, and the second dielectric layer can be SiN. In these cases, the goal of the polishing apparatus 100 can be to expose portions of the second dielectric layer by removing the corresponding portions of the first dielectric layer.

The carrier heads 126 can be suspended from a support 128, and movable between the polishing stations. In some implementations, the support 128 is an overhead track and the carrier heads 126 are coupled to a carriage 108 that is mounted to the track. The overhead track 128 allows each carriage 108 to be selectively positioned over the polishing stations 124 and the transfer station. Alternatively, in some implementations the support 128 is a rotatable carousel, and rotation of the carousel moves the carrier heads 126 simultaneously along a circular path.

Each polishing station 106 of the polishing apparatus 100 can include a port, e.g., at the end of an arm 134, to dispense polishing liquid 136, such as abrasive slurry, onto the polishing pad 130. Each polishing station 106 of the polishing apparatus 100 can also include pad conditioning apparatus to abrade the polishing pad 130 to maintain the polishing pad 130 in a consistent abrasive state.

Each carrier head 126 is operable to hold a substrate 10 against the polishing pad 130. Each carrier head 126 can have independent control of the polishing parameters, for example pressure, associated with each respective substrate. In particular, each carrier head 126 can include a retaining ring 142 to retain the substrate 10 below a flexible membrane 144. Each carrier head 126 also includes a plurality of independently controllable pressurizable chambers defined by the membrane, e.g., three chambers 146a-146c, which can apply independently controllable pressurizes to associated zones on the flexible membrane 144 and thus on the substrate 10. Although only three chambers are illustrated in FIG. 1 for ease of illustration, there could be one or two chambers, or four or more chambers, e.g., five chambers.

Each carrier head 126 is suspended from the support 128, and is connected by a drive shaft 154 to a carrier head rotation motor 156 so that the carrier head can rotate about an axis 127. Optionally each carrier head 126 can oscillate laterally, e.g., by driving the carriage 108 on the track 128, or by rotational oscillation of the carousel itself. In operation, the platen is rotated about its central axis 127, and each carrier head is rotated about its central axis 127 and translated laterally across the top surface of the polishing pad. The lateral sweep is in a direction parallel to the polishing surface of the polishing pad 130. The lateral sweep can be a linear or arcuate motion.

A controller 190, such as a programmable computer, is connected to each motor to independently control the rotation rate of the platen 120 and the carrier heads 126. For example, each motor can include an encoder that measures the angular position or rotation rate of the associated drive shaft. Similarly, the controller 190 is connected to an actuator in each carriage 108 and/or the rotational motor for the carousel to independently control the lateral motion of each carrier head 126. For example, each actuator can include a linear encoder that measures the position of the carriage 108 along the track 128.

The controller 190 can include a central processing unit (CPU), a memory, and support circuits, e.g., input/output circuitry, power supplies, clock circuits, cache, and the like. The memory is connected to the CPU. The memory is a non-transitory computable readable medium, and can be one or more readily available memory such as random access memory (RAM), read only memory (ROM), floppy disk, hard disk, or other form of digital storage. In addition, although illustrated as a single computer, the controller 190 could be a distributed system, e.g., including multiple independently operating processors and memories.

The in-line optical metrology system 160 is positioned within the polishing apparatus 100, but does not perform measurements during the polishing operation; rather measurements are collected between polishing operations, e.g., while the substrate is being moved from one polishing station to another or from or to the transfer station.

The in-line optical metrology system 160 includes a sensor assembly 161 supported at a position between two of the polishing stations 106, e.g., between two platens 120. In particular, the sensor assembly 161 is located at a position such that a carrier head 126 supported by the support 128 can position the substrate 10 over the sensor assembly 161.

In implementations in which the polishing apparatus 100 includes three polishing stations and carries the substrates sequentially from the first polishing station to the second polishing station to the third polishing station, one or more sensor assemblies 161 can be positioned between the transfer station and the first polishing station, between first and second polishing stations, between the second and third polishing stations, and/or between the third polishing station and the transfer station.

The sensor assembly 161 can include a light source 162, a light detector 164, and circuitry 166 for sending and receiving signals between the controller 190 and the light source 162 and light detector 164.

The light source 162 can be operable to emit white light. In one implementation, the white light emitted includes light having wavelengths of 200-800 nanometers. A suitable light source is an array of white-light light emitting diodes (LEDs), or a xenon lamp or a xenon mercury lamp. The light source 162 is oriented to direct light 168 onto the exposed surface of the substrate 10 at a non-zero angle of incidence α. The angle of incidence a can be, for example, about 30° to 75°, e.g., 50°.

The light source 162 can illuminate a substantially linear elongated region that spans the width of the substrate 10. The light source 162 can include optics, e.g., a beam expander, to spread the light from the light source into an elongated region. Alternatively or in addition, the light source 162 can include a linear array of light sources. The light source 162 itself, and the region illuminated on the substrate, can be elongated and have a longitudinal axis parallel to the surface of the substrate.

A diffuser 170 can be placed in the path of the light 168, or the light source 162 can include a diffuser, to diffuse the light before it reaches the substrate 10.

The detector 164 can be a color camera that is sensitive to light from the light source 162, e.g. a camera that has separate detector elements for each of multiple channels, e.g. a red channel, a green channel, and a blue channel. In other implementations, the detector 164 can be a luminance sensor, i.e., a sensor that has detector elements for a single luminance channel. The following description will refer to the detector 164 as a camera for convenience, but the descriptions applies to other types of the detector 164.

The camera includes an array of detector elements. For example, the camera can include a CCD array. In some implementations, the array is a single row of detector elements. For example, the camera can be a linescan camera. The row of detector elements can extend parallel to the longitudinal axis of the elongated region illuminated by the light source 162. Where the light source 162 includes a row of light emitting elements, the row of detector elements can extend along a first axis parallel to the longitudinal axis of the light source 162. A row of detector elements can include 1024 or more elements.

The camera 164 is configured with appropriate focusing optics 172 to project a field of view of the substrate onto the array of detector elements. The field of view can be long enough to view the entire width of the substrate 10, e.g., 150 to 300 mm long. The camera 164, including associated optics 172, can be configured such that individual pixels correspond to a region having a length equal to or less than about 0.5 mm. For example, assuming that the field of view is about 200 mm long and the detector 164 includes 1024 elements, then an image generated by the linescan camera can have pixels with a length of about 0.5 mm. To determine the length resolution of the image, the length of the field of view (FOV) can be divided by the number of pixels onto which the FOV is imaged to arrive at a length resolution.

The camera 164 can be also be configured such that the pixel width is comparable to the pixel length. For example, an advantage of a linescan camera is its very fast frame rate. The frame rate can be at least 5 kHz. The frame rate can be set at a frequency such that as the imaged area scans across the substrate 10, the pixel width is comparable to the pixel length, e.g., equal to or less than about 0.3 mm.

The light source 162 and the light detector 164 can be supported on a stage 180. Where the light detector 164 is a line-scan camera, the light source 162 and camera 164 are movable relative to the substrate 10 such that the imaged area can scan across the length of the substrate. In particular, the relative motion can be in a direction parallel to the surface of the substrate 10 and perpendicular to the row of detector elements of the linescan camera 164.

In some implementations, the stage 180 is stationary, and the carrier head 126 moves, e.g., either by motion of the carriage 108 or by rotational oscillation of the carousel. In some implementations, the stage 180 is movable while the carrier head 126 remains stationary for the image acquisition. For example, the stage 180 can be movable along a rail 184 by a linear actuator 182. In either case, this permits the light source 162 and camera 164 to stay in a fixed position relative to each other as the area being scanned moves across the substrate 10.

A possible advantage of having a line-scan camera and light source that move together across the substrate is that, e.g., as compared to a conventional 2D camera, the relative angle between the light source and the camera remains constant for different positions across the wafer. Consequently, artifacts caused by variation in the viewing angle can be reduced or eliminated. In addition, a line scan camera can eliminate perspective distortion, whereas a conventional 2D camera exhibits inherent perspective distortion, which then needs to be corrected by an image transformation.

The sensor assembly 161 can include a mechanism to adjust vertical distance between the substrate 10 and the light source 162 and detector 164. For example, the sensor assembly 161 can include an actuator to adjust the vertical position of the stage 180.

Optionally a polarizing filter 174 can be positioned in the path of the light, e.g., between the substrate 10 and the detector 164. The polarizing filter 174 can be a circular polarizer (CPL). A typical CPL is a combination of a linear polarizer and quarter wave plate. Proper orientation of the polarizing axis of the polarizing filter 174 can reduce haze in the image and sharpen or enhance desirable visual features.

Assuming that the outermost layer on the substrate is a semitransparent layer, e.g., a dielectric layer, the luminance of light detected at detector 164 depends on, e.g., the composition of the substrate surface, substrate surface smoothness, and/or the amount of interference between light reflected from different interfaces of one or more layers (e.g., dielectric layers) on the substrate.

As noted above, the light source 162 and light detector 164 can be connected to a computing device, e.g., the controller 190, operable to control their operation and receive their signals.

Figure 2:
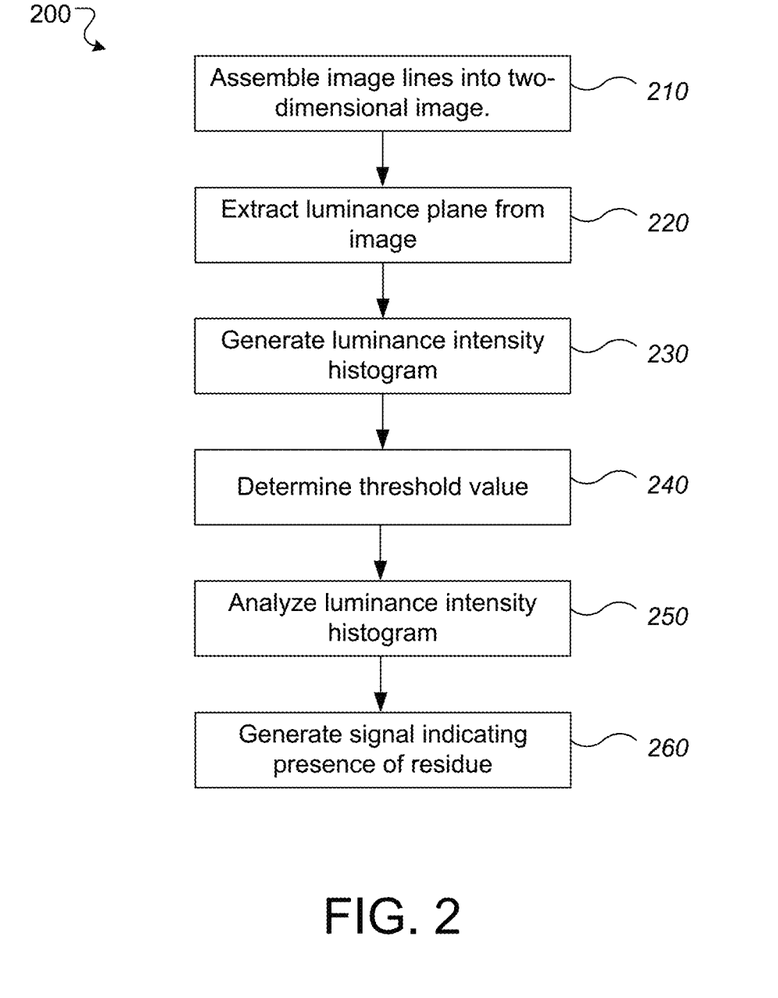
FIG. 2 is a flow chart for an example process for determining the presence of residue on a substrate.

Referring to FIG. 2 showing a method 200, the controller assembles the individual image lines from the light detector 164 into a two-dimensional image (step 210). If the detector 164 is a camera, then the camera can include separate detector elements for each of multiple channels, e.g. a red channel, a green channel, and a blue channel. The two-dimensional image can include monochromatic images for each of the channels.

The controller can extract a luminance plane from the image (step 220). As described above, luminance is a measure of the intensity of light. Thus, the luminance plane contains a measure of the intensity of each pixel in the image. In some implementations, the controller transforms the image from a red-green-blue (RGB) color space to a hue-saturation-luminance (HSL) color space, and then extracts the luminance channel of the image in the HSL color space as the luminance plane.

Figure 3:
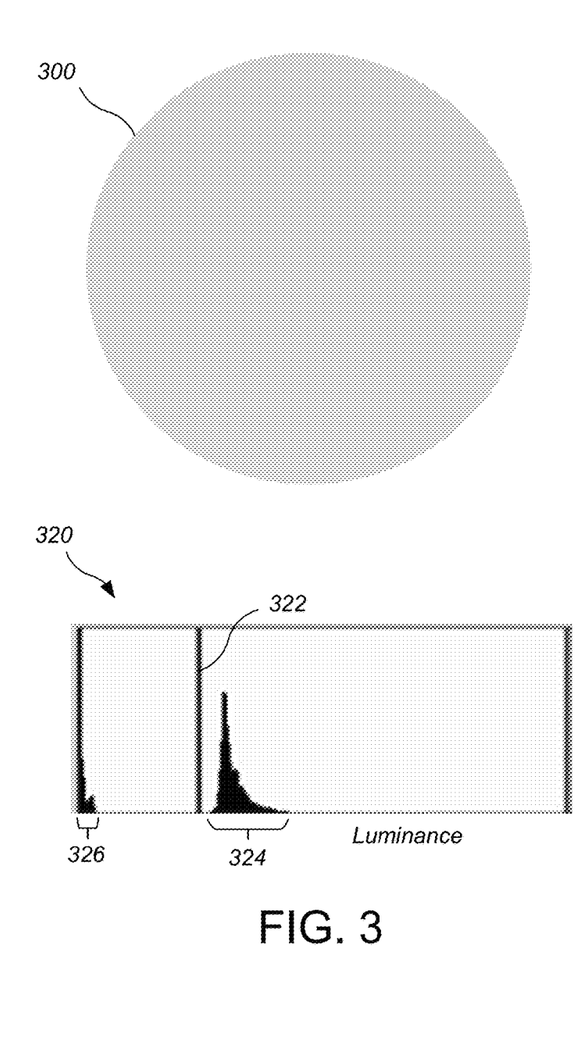
FIG. 3 illustrates an example properly-polished wafer and a corresponding luminance histogram graph.
Figure 4:
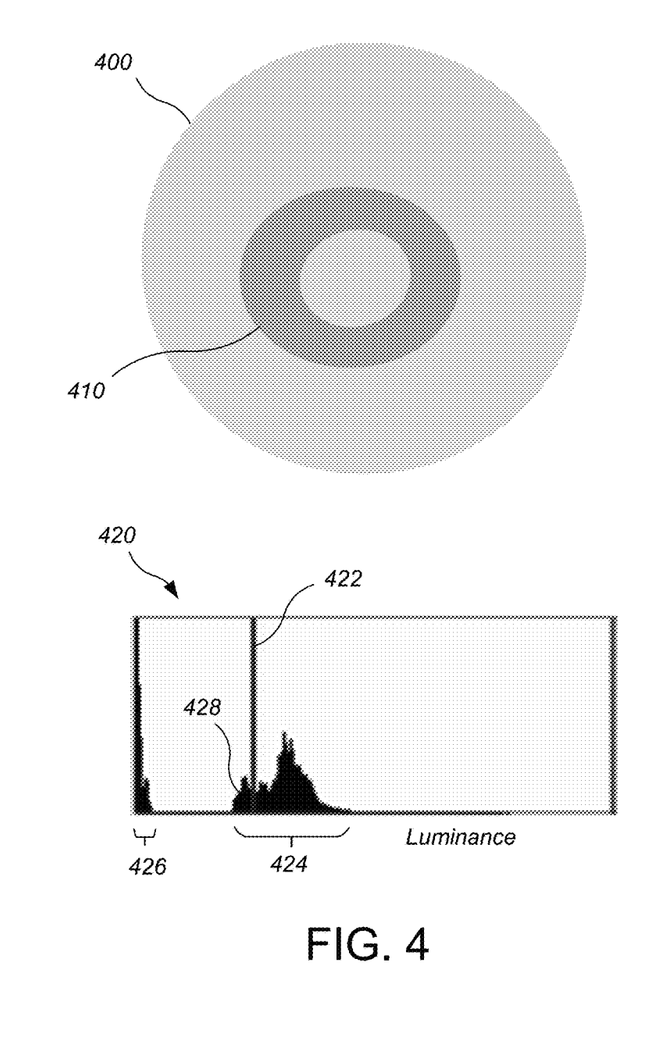
FIG. 4 illustrates an example wafer with residue and a corresponding luminance histogram graph.
Figure 5:
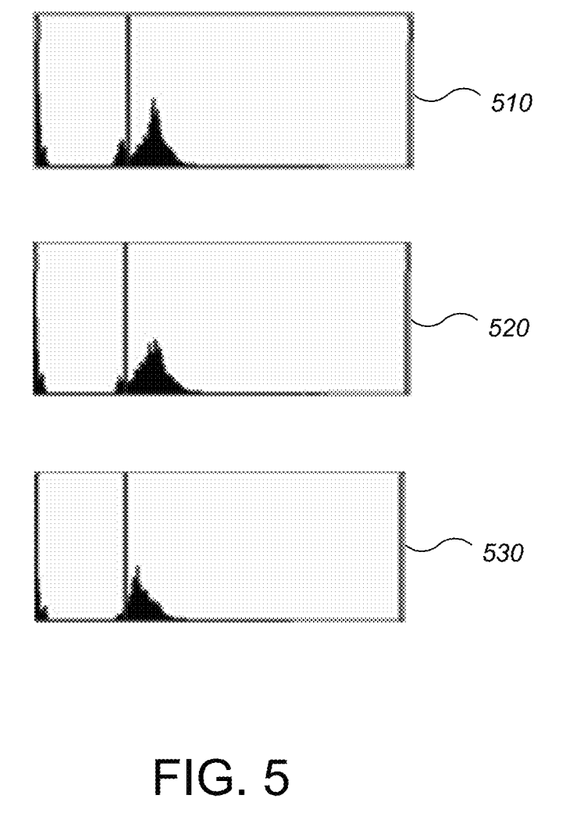
FIG. 5 illustrates three example luminance histogram graphs of wafers with residue.

The controller generates a luminance intensity histogram from the extracted luminance plane (step 230). The intensity histogram indicates the total number of pixels having a particular luminance value as a function of the luminance. Example graphs of intensity histograms are illustrated in FIGS. 3-5, although such graphs need not be displayed.

In some implementations, the controller can generate a luminance intensity histogram without assembling the image. For example, if the detector 164 is a luminance sensor, then the controller can receive a luminance value for each detector element, and thus the controller can generate a luminance intensity histogram directly from the data that the controller receives from the detector 164. As another example, if the detector 164 is a linescan camera, the controller can extract luminance values (step 220) directly from the image lines generated by the camera, and generate the luminance intensity histogram from the extracted luminance values, skipping the image assembly step (step 230).

The controller determines a threshold intensity value (step 240). The threshold value is a value in the luminance intensity histogram.

In general, a histogram corresponding to a substrate that is properly polished will have higher intensity values than a histogram corresponding to a substrate that is not properly polished. For example, the substrate can have a first dielectric layer disposed over a second dielectric layer. If the substrate is properly polished, then the second dielectric layer will be exposed; if the substrate is not properly polished, then the second dielectric layer will be at least partially covered by residue from the first dielectric layer. Often, the second dielectric layer is more reflective than the first dielectric layer, and thus the luminance values of the second dielectric layer are higher than the luminance values of the first dielectric layer. This is true, e.g., when the first dielectric layer is a low-κ dielectric and the second dielectric layer is SiN. Thus, if the substrate has residue from the first dielectric layer covering the second dielectric layer, then the luminance intensity histogram will contain lower values than if the substrate were properly polished. Therefore, the threshold value is determined so that a luminance intensity histogram corresponding to a properly-polished substrate will have relatively few pixel values below the threshold value, while a luminance intensity histogram corresponding to a substrate that has residue will have relatively many pixel values below the threshold.

Referring to FIG. 3, a substrate 300 that does not contain any residue will have a corresponding luminance intensity histogram 320 that contains a very low proportion of luminance values below a threshold value 322. As illustrated, most of the luminance values are in a cluster 324 above the threshold. Although there is a cluster 326 of luminance values below the threshold, these can be explained due to the lack of reflectance from regions surrounding the substrate. In general this cluster 326 can be distinguished by being adjacent to the zero luminance and being separated from the cluster 324 attributable to reflection from the substrate.

In contrast, referring to FIG. 4, the presence of residue 410 on a substrate 400 will cause the corresponding luminance intensity histogram 420 to contain a high proportion of luminance values below the threshold value 422. In particular, although the histogram 420 includes a cluster 426 of luminance values adjacent to zero luminance below the threshold, the histogram 420 also includes a cluster 424 of luminance values having a portion 428 below the threshold value 422.

An operator can determine the threshold intensity value using intensity histograms of multiple substrates, e.g., test substrates. The multiple test substrates can have the same properties as the substrate being analyzed by the controller, e.g. the same dielectric layers, the same initial thickness, etc. The polishing apparatus 100 can polish the test substrates so that the resulting polished test substrates are a representative sample of the possible polishing outcomes of the polishing apparatus 100, e.g. a range of test substrates that are properly polished and a range of test substrates that are not properly polished.

Each of the test substrates can be measured to generate a corresponding luminance intensity histogram. The operator can use the intensity histograms of the test substrates to determine a threshold value so that the histograms for the test substrates that are not properly polished do not satisfy one or more criteria related to the threshold, whereas the histograms for the test substrates that are properly polished do satisfy the one or more criteria. Example criteria are discussed below.

Referring back to FIG. 2, after polishing of a device substrates (i.e., a substrate intended to be used for fabrication of integrated circuits), the device substrate is measured, and the controller analyzes the resulting intensity histogram (step 250). Using the previously determined threshold value, the controller can determine whether the substrate characterized by the intensity histogram is properly polished, according to one or more criteria.

For example, the criteria can specify a maximum number or proportion of pixels in the histogram that may fall below the threshold value, e.g. 10% or 102 pixels if the luminance plane has 1024 total pixels. In this case, the controller can calculate the number or proportion of pixels whose values fall below the threshold value, and determine whether the number or proportion exceeds the maximum allowable limit.

As another example, the controller can identify a cluster (e.g., cluster 424 in FIG. 4) of luminance values that includes some values above the threshold. The criteria can specify a maximum allowable peak height, peak width, peak shape, or degree of asymmetry of the cluster or of the portion of the cluster that is below the threshold value. The controller can determine whether a peak exists in the intensity histogram below the threshold value, e.g. using peak-finding techniques. If a peak does exist below the threshold value, the controller can analyze it according to the criteria, e.g., the controller can measure the width, height, shape of the peak, and degree of symmetry of the peak and compare the values against the maximum allowed values.

If the intensity histogram does not satisfy the one or more criteria, then the controller can generate a signal indicating the presence of residue (step 206). The signal can be used to alert a user or another system controlling the polishing apparatus 100 that the substrate characterized by the intensity histogram is not properly polished. In some implementations, if the controller determines that the substrate is not properly polished, then the substrate is moved by the carrier head 126 back to a polishing station to continue polishing. In some other implementations, if the controller determines that the substrate is not properly polished, then the substrate is discarded.

FIG. 5 illustrates three example luminance intensity histograms corresponding to wafers that have residue, i.e. are not properly polished. The first intensity histogram 510 has a large proportion of pixel values that form a distinct peak below the threshold value, illustrated in blue. The second intensity histogram 520 has a smaller proportion of pixel values that form a less-distinct peak below the threshold value, again illustrated in blue, than the first intensity histogram 510. The third intensity histogram 530 has a much smaller proportion of pixel values below the threshold value than either the first intensity histogram 510 or the second intensity histogram 520, and the pixels that are below the threshold value of the third intensity histogram 530 do not form a distinguishable peak. The three intensity histograms 510, 520, and 530 illustrate the difficulty of determining the threshold value and the one or more criteria by which to analyze a histogram. The determined threshold and the one or more criteria must be robust to these three varied histograms.

Although the term "luminance" has been used, this should be understood as covering similar brightness parameters that are not associated with intensity of a particular color channel, e.g., lightness (from an HSL color space) or value (from an HSV color space).

A number of embodiments have been described. Nevertheless, it will be understood that various modifications may be made without departing from the spirit and scope of the subject matter described.

What is claimed is:

1. A method of determining whether a substrate is properly polished, comprising:
    obtaining an image of the substrate;
    obtaining intensity values of a luminance plane for the image;
    generating an intensity histogram from the intensity values of the luminance plane for the image, wherein the intensity histogram indicates a number of pixels in the image having a particular intensity value in the luminance plane as a function of luminance; and
    analyzing the intensity histogram to determine whether the intensity histogram meets one or more criteria.

2. The method of claim 1, wherein obtaining the image comprises obtaining a raw image having three color planes, and obtaining the intensity values for the luminance plane comprises calculating the intensity values for the luminance plane based on values in the color planes.

3. The method of claim 2, wherein calculating the intensity values for the luminance plane comprises transforming the raw image from an RGB color space to a hue-saturation-luminosity color space.

4. The method of claim 1, wherein obtaining the image comprises obtaining a raw image having a luminance plane.

5. The method of claim 1, comprising calculating a threshold value from intensity histograms of a plurality of test substrates.

6. The method of claim 1, wherein analyzing the intensity histogram comprises detecting a presence of a peak in the intensity histogram below a threshold value.

7. The method of claim 1, wherein analyzing the intensity histogram comprises detecting that a peak in the intensity histogram extends across a threshold value.

8. The method of claim 1, wherein analyzing the intensity histogram comprises determining one or more of a peak width, a peak shape, or a degree of asymmetry of a peak in the intensity histogram.

9. The method of claim 1, comprising determining that the intensity histogram does not meet the one or more criteria, and generating a signal indicating presence of residue on the substrate.

10. The method of claim 1, wherein the substrate comprises a first dielectric layer disposed over a second dielectric layer.

11. The method of claim 10, wherein the first dielectric layer is a low-κ dielectric material and the second dielectric layer is SiN.

12. A computer program product, tangibly embodied in non-transitory computer readable medium, comprising instructions for causing one or more processors to:
    receive an image of a substrate;
    obtain intensity values of a luminance plane for the image;
    generate an intensity histogram from the intensity values of the luminance plane for the image, wherein the intensity histogram indicates a number of pixels in the image having a particular intensity value in the luminance plane as a function of luminance; and
    analyze the intensity histogram to determine whether the intensity histogram meets one or more criteria.

13. The computer program product of claim 12, wherein the instructions to obtain the intensity values comprise instructions to calculate the intensity values based on values in three color planes from the image.

14. The computer program product of claim 13, wherein the instructions to calculate the intensity values comprise instructions to transform the image from an RGB color space to a hue-saturation-luminosity color space.

15. The computer program product of claim 12, wherein the instructions to analyze the intensity histogram comprise instructions to detect a presence of a peak in the intensity histogram below a threshold value.

16. The computer program product of claim 12, wherein the instructions to analyze the intensity histogram comprise instructions to detect that a peak in the intensity histogram extends across a threshold value.

17. The computer program product of claim 12, wherein the instructions to analyze the intensity histogram comprise instructions to determine one or more of a peak width, a peak shape, or a degree of asymmetry of a peak in the intensity histogram.

18. The computer program product of claim 12, comprising instructions to generating a signal indicating presence of residue on the substrate if the intensity histogram does not meet the one or more criteria.

19. A system for obtaining a measurement representative of a thickness of a layer on a substrate, comprising:
   a support to hold a substrate for integrated circuit fabrication;
   an optical assembly to capture an image of at least a portion of the substrate; and
   a controller configured to
      receive the image from the optical assembly,
      obtain intensity values of a luminance plane for the image,
      generate an intensity histogram from the intensity values of the luminance plane for the image, wherein the intensity histogram indicates a number of pixels in the image having a particular intensity value in the luminance plane as a function of luminance, and
      analyze the intensity histogram to determine whether the intensity histogram meets one or more criteria.

\* \* \* \* \*